Jan. 15, 1963         W. CRABTREE         3,073,161
              HUMIDITY SENSING ELEMENT
                Filed Nov. 27, 1959

INVENTOR.
Wilbur Crabtree
BY
Frederick M. Ritchie
His Attorney

United States Patent Office 3,073,161
Patented Jan. 15, 1963

3,073,161
HUMIDITY SENSING ELEMENT
Wilbur Crabtree, Dayton, Ohio, assignor to General Motors Corporation, Detroit, Mich., a corporation of Delaware
Filed Nov. 27, 1959, Ser. No. 855,756
6 Claims. (Cl. 73—336.5)

This invention relates to a domestic appliance and more particularly to an improved humidity sensing element for a clothes dryer.

Different moisture sensitive films for a dryness sensing element were set forth in the concurrently filed copending application Serial No. 855,589. In addition, a control circuit was there provided in which the humidity sensing element may act directly (without amplifying the signal) to terminate a drying cycle. In the copending application a mass ionization concept was set forth in which a humidity or moisture sensitive device is designed to carry currents in the milliamps range. The current carrying capacity of these elements has permitted the actuation of control components directly without the need for amplifying devices between the control component and the sensing element. The copending application teaches the generic mass ionization concept wherein a moisture sensitive film is comprised of acrylic derivatives, phenolic derivatives or amide derivatives. These coatings or films provide excellent humidity reactive coatings for the electrodes of an electric hygrometer. However, the rigidity of these plastic type coatings gives rise to a slight separation or cracking of the film from the electrodes when the element is used in an appliance having a life expectancy of many years.

Accordingly, it is an object of this invention to provide a film for a humidity sensing device which has an improved life expectancy and which will thus be suitable for use in an appliance having extended life requirements.

It is also an object of this invention to provide a humidity sensing element having a conductive membrane between electrodes which consists of a rubber latex.

It is also an object of this invention to provide a humidity sensing device including electrodes embedded therein, wherein the device is comprised of a rubber latex film compounded with electrolytes.

A further object of this invention is to provide a resilient conductive membrane for a humidity sensing element which is capable of mass ionization when exposed to moisture.

An additional object of this invention is the provision of a conductive membrane for a humidity sensing device which is comprised of milkweed latex obtained from one of the Asclepias plants, such as the *syriaca*.

Further objects and advantages of the present invention will be apparent from the following description, reference being had to the accompanying drawing wherein a preferred embodiment of the present invention is clearly shown.

Figure 1:
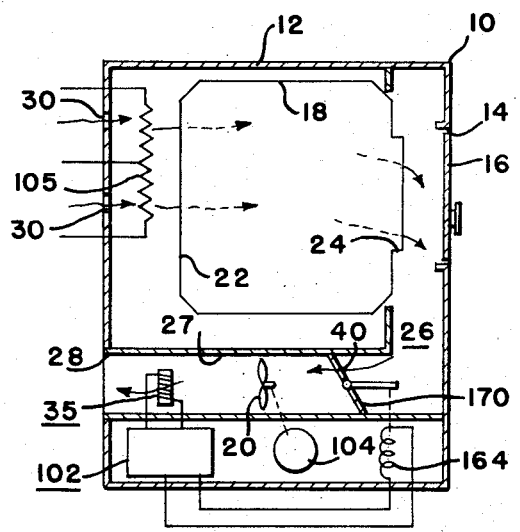
FIGURE 1 is a schematic side sectional view of a clothes dryer suitable for use with this invention.

In accordance with this invention and with reference to FIGURE 1, a clothes dryer 10 is shown comprised of a casing 12 having a front opening 14 closed by a door 16. Within the casing 12, a tumbling drum 18 is adapted to be rotated by any conventional means to tumble clothes or fabric in the path of air circulated by a blower 20. Both the blower 20 and the tumbling drum 18 may be rotated by a motor 104 installed within the casing 12 of the dryer. A rear wall 22 of the drum 18 is perforated to place the interior of the drum in communication with a heating element 105. At the front of the drum 18 an excess opening 24 is provided in axial alginment with the dryer door 16. The opening 24 communicates with a front duct 26 which connects through an exhaust duct 27 to an exhaust opening 28 in the rear wall of the dryer casing 12. Inlet openings 30 are formed in the rear wall of the casing adjacent the heating element 105. Thus, the energization of the blower 20 will set up an air circulation through the tumbling drum as follows: air will enter the dryer casing 12 through the inlet openings 30 and will be heated by the heating element 105. The heated air will then flow through the perforated rear wall 22 of the tumbling drum 18 and exit from the tumbling drum by way of the access opening 24 at the front thereof. Air will follow the front duct 26 toward the exhaust opening 28 as induced by the lower 20. While passing through the tumbling drum 18, moisture will be entrained in the air flow and transmitted through the duct work 26 and 27 to the exhaust opening 28.

Disposed within the exhaust duct 27 is a humidity sensing element 35. The humidity sensor 35 is one component of a humidity sensing assembly 102 such as is used in the control circuitry of FIGURE 5 in the copending application Ser. No. 855,589. Note that the element 35 is interchangeable in this control circuit with those sensing elements 68 and 154 described in the copending case. As with the moisture sensing elements in the generic case, the element 35 embodies the mass ionization concept which enables the element to carry sufficient current (milliamps) to operate an alternating current relay or control directly without amplification. It should be understood that the humidity sensing element 35 may be placed in positions other than the vertical position shown in FIGURE 1. It is important only that the element 35 be disposed in a manner within the moisture laden exhaust air stream to effect an indication of the relative humidity of the air being transmitted thereover.

One of the problems in correctly sensing a moisture condition of air is the response of the element to a rapidly flowing current of air. To increase the control sensitivity of the system it is desirable to reduce the amount of air flow past the humidity sensing element during certain periods which will hereinafter be referred to as test periods. During a test period the heat input to the tumbling drum 18 is reduced as well and this arrangement of reduced air, reduced heat will concentrate the remaining moisture in the reduced volume of air flowing past the humidity sensor. If the moisture or relative humidity of the air climbs above a predetermined figure, say 40% R.H., before the test period expires, the dryer will again be conditioned for full air flow and full heat and the drying cycle will continue. To accomplish these ends, a damper 170 is installed within the exhaust duct 27 and adapted to be controlled by a solenoid 164 in the dryer control circuit (FIGURE 5 of the copending case). The damper 170 includes a small weep hole or bleed opening 40 which allows a small regulated amount of air flow to pass over the humidity sensing element 35 even when the damper 170 is closed.

The operation of the dryer 10, briefly stated, is as follows: Damp clothes are placed through the access door 16 into the drum 18. The dryer is turned on to energize the heating element 105 to heat up the air passing through the tumbling drum. At the same time, the motor 104 is energized to rotate the tumbling drum 18 and the blower 20. During the first part of the drying cycle when the relative humidity is below approximately 35% R.H., the damper 170 will be closed and the heater 105 energized to provide rapid heat up within the tumbling drum. This also prevents the humidity sensing element 35 from giving a false indication of the dryness prior to the time that sufficient moisture is entrained in the passing air to give the sensing element 35 a true picture of the clothes dryness condition. As soon as the exhaust air indicates a moisture condition or high relative humidity, above approximately 40% R.H., the damper 170 will be opened and the heating element 105 will be energized to give maximum input to the dryer. As the moisture is vaporized from the tumbling fabrics, the clothes tend to become dry. After a duration of time, depending on the fabric and the size of the load, the relative humidity of the circulating air will fall and the humidity sensing element 35 will transmit this indication of dryness through the humidity sensing assembly 102, which will program a test period as follows: The damper 170 will close to restrict air flow and the heater 105 will be energized for reduced input. If the moisture in the air passing the element 35 fails to increase above its predetermined setting during the test period, the cycle will be terminated automatically. A more complete description of the clothes dryer operation will be understood with reference to the teachings in the aforesaid copending application.

Figure 3:
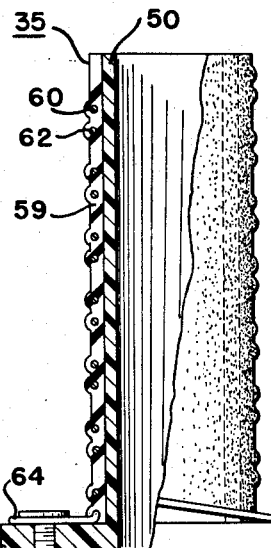
FIGURE 3 is a side elevational view partly in section of another embodiment of the humidity sensing element of this invention.

With reference to FIGURE 3 the sensing element 35 is comprised of a support member 50 of polyethylene plastic or other suitable non-conducting material. The support 50 is cylindrical or tubular in cross section and is provided with an integral peripheral flange 52 on one side of which is an electrical terminal 54 and on the other side of which is an electrical terminal 56. Overlying the support portion 50 is a moisture sensitive film 59 in which are embedded two spaced or parallel wound copper wire conductors 60, 62, approximately 0.008 to 0.010 inch in diameter. Each conductor is spirally wound around the support cylinder 50 approximately twenty turns, thereby making a total of forty turns, and embedded in the latex film 59. One end 64 of the conductor 62 is attached to the terminal connector 54 while the end 66 of conductor 60 is attached to the terminal bolt 56. Thus, there is provided a pair of spaced conductors to form a bifilar humidity sensor. Depending on the amount of moisture in the air surrounding the element 35, a certain amount of ionization occurs within the film 59 and a potential is developed across the conductors 60, 62. The current carrying capacity of the element may be used to indicate a signal which is effective to operate a control directly.

The mass ionization techniques of this invention are accomplished by chemically bonding or retaining an hygroscopic material in an insoluble supporting film or fixed mass capable of attracting moisture. The ionizable material is homogeneously dispersed throughout the film in fixed relation to the film to place the ionizable material in a continuous phase, i.e., the ionizable particles are so closely contiguous in the dried out sensing element that they become continuous when moisture is absorbed by the element. Thus, the film uses a mass ionization technique wherein the presence of moisture is reflected throughout the entire film rather than at the surface only thereof. The utilization of this mass ionization technique gives rise to a current carrying capacity for the humidity sensitive elements in the order of milliamps. Such current may be used to operate an alternating current relay or other relay devices directly in a control circuit for a clothes dryer.

Figure 2:
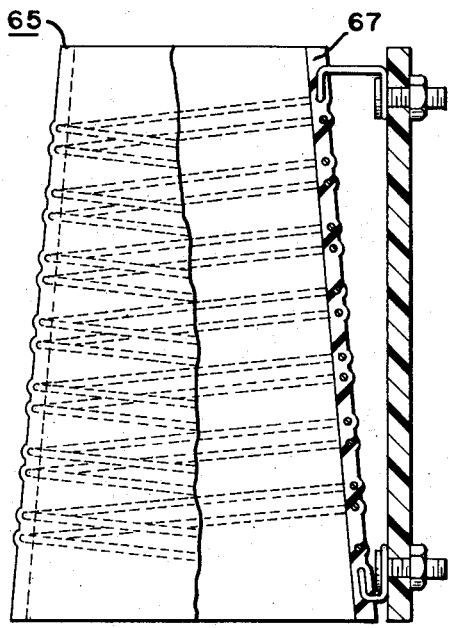
FIGURE 2 is a side elevational view partly in section of one embodiment of the humidity sensing element of this invention, the formation of which is taught in the copending application.

Another embodiment or humidity sensor 65 is seen in FIGURE 2 and shows a latex film 67 formed into a hollow conically shaped element in which the film and the pair of conductors therein are self-supporting. Further details on the construction of element 65 are taught in the copending application as it refers to the FIGURES 2 and 3 therein.

A satisfactory element 35 or 65 for sensing humidity must be capable of extended life in atmospheres reflecting different temperatures. Where the sensing element includes spaced electrodes to form a bifilar device for carrying control actuating sensing currents, it is imperative that the humidity sensing film remain in intimate contact with the electrodes. This invention relates to the use of a latex as a coating or film 59 or 67 in which the electrodes may be embedded.

A particularly effective latex coating has been obtained from one of the Asclepias plants, namely the *syriaca* or common milkweed, which occurs commonly throughout the United States. *Asclepias cyriaca* latex may be kept for long periods under normal refrigeration and is comprised generally of 70% water, 3% rubber hydrocarbon and 27% resin and inorganic salts. About 60% of the total solids in milkweed latex are resins and only about 11% are rubber, thereby contrasting in this respect to natural rubber. The ability to ionize without the addition of electrolytes to the milkweed latex may be a characteristic resulting from such composition.

EXAMPLE I.—*ASCLEPIAS SYRIACA*

The process of applying the milkweed latex is as follows: One complete film or coating 59 is applied to the cylinder 50 of the element 35 with a camel's hair brush. Dipping of the cylinder 50 into the latex may also be used. Note also that in the case of element 65 the coating is applied to the conical mandrel as taught more fully in the copending application.

The coated element 35 or 65 is then air dried at room temperature between 70° F. and 80° F. When dry, the coated element is baked for two hours at 150° F. in a controlled oven to remove the excess moisture. Subsequent to the baking operation the element is permitted to cool for at least one hour at room temperature.

The element 35 or 65 is now ready for use and may be installed directly in a 110 volt A.C. circuit and tested to ten milliamps capacity. This is more than sufficient current carrying capacity for sensitive type relays. Of course, it should be recognized that the milkweed latex coated elements may also be used in circuits where amplification is provided, even though it is the purpose of this invention to overcome the need for such amplification.

The constancy or dependability under extended test conditions were definitely superior to the plastic films outlined in connection with the aforesaid copending application. Since milkweed latex is a rather difficult substance to commercialize, other natural rubber and synthetic rubber latices have been used and found to approach the milkweed latex in humidity or moisture sensitivity. Further compounding with electrolytes, such as sodium chloride, improves the conductivity of the natural rubber latex and its life appears substantially better than either the acrylic or the polyamide plastic films of the copending application. It is important in operation, however, that the latex film not be baked out at temperatures above 140° F. if the life expectancy of the sensing element is to be satisfactory.

The activity of the rubber latex films is believed to come from the pure physical retention of natural and/or added electrolyte. A typical composition of natural rubber latex is:

| | Percent |
|---|---|
| Water | 67.00 |
| Rubber hydrocarbon | 29.50 |
| Protein | 0.90 |
| Acetone extract (sterolesters, fatty acids and phytosterol) | 1.00 |
| Quebrachitol | 1.15 |
| Stero glucosides | 0.07 |
| Ash | 0.45 |

The ash contains the natural ionizing electrolytes such as KCl, $K_3PO_4$, $Na_3PO_4$. It should be recognized that any additive such as acid, base or salt, which is ionizable is satisfactory for further impregnating the latex film to achieve an increased reaction to humidity.

Following are several examples of films compounded with natural rubber latex. It should be understood that films explained in connection with element 35 are also applicable to element 65.

EXAMPLE II.—NATURAL RUBBER LATEX FILM

To a natural rubber latex comprised of 62.5% solids, 0.25% Santobrite, and 0.15% ammonia, add water to produce a 50–50 part natural rubber latex to water mixture. Apply this mixture on the cylinder 50 of the element 35 and allow the film to dry three hours at 140° F.

EXAMPLE III.—NATURAL RUBBER LATEX AND ADDITIVES

Prepare a latex-water mixture. Saturate the water with any one of the following materials or groupings: NaCl, (NaCl and quaternary ammonium salt), NaI, ($KNO_3$ and NaCl), $CaHPO_4$, NaBr or Ca $(NO_3)_2$. Prepare a 50–50 mixture of natural rubber latex to saturated water. Apply this latex-water mixture to form a film on the cylinder 50 of the sensing element 35. Allow the film to dry for three hours at 140° F.

It should now be seen that an improved film has been provided for a humidity sensing element wherein the electrical conductors of the element are firmly and permanently embedded in a resilient film of latex which will not shrink or dry out with age.

While the embodiment of the present invention as herein disclosed, constitutes a preferred form, it is to be understood that other forms might be adopted.

What is claimed is as follows:

1. A humidity sensitive element comprising a cylindrical support member having an integral annular flanged base portion, a first electrical terminal on said base portion, a second electrical terminal on said base portion, an *Asclepias syriaca* latex film on said support member, said film including an electrolytic and an hydroscopic material, whereby a mass ionization throughout said film occurs when said film is exposed to moisture, and first and second electrical conductors connected to said first and second terminals, respectively, and embedded in said film in a spiral convolution about said support member.

2. A humidity sensitive element comprising a support member having a base portion, at least a pair of electrical terminals connected to said base portion, a polymerized latex layer on said support member having a polymer portion, said polymer portion being electrolytic and hygroscopic in nature, at least a pair of electrical conductors connected to said terminals and embedded in said polymer portion in a spiral convolution about said support member, whereby a mass ionization throughout said polymer portion occurs when said polymer portion is exposed to moisture, said mass ionization facilitating a current carrying capacity for said element in the range of approximately ten milliamps.

3. A humidity sensitive element having a base portion and comprising, electrical terminal means connected to said base portion, a polymerized latex film on said base portion having a polymer portion, said polymer portion being electrolytic and hygroscopic in nature, electrical conductor means connected to said terminal means and embedded in said polymer portion, whereby a mass ionization throughout said polymer portion occurs when said film is exposed to moisture, said mass ionization facilitating a current carrying capacity for said element in the milliamps range.

4. A humidity sensitive element comprising, a self-supporting latex film, said film being electrolytic and hygroscopic in nature, electrical conductor means embedded in said film, whereby a mass ionization throughout said film occurs when said film is exposed to moisture, said mass ionization facilitating a current carrying capacity for said element in the milliamps range.

5. A humidity sensitive element comprising an insoluble latex film capable of attracting moisture and having ionizable material homogeneously dispersed throughout the film in fixed relation to the film to place the ionizable material in continuous phase, said latex film throughout being electrolytic in nature in the presence of moisture, and electrical conductor means embedded in said latex film, whereby a mass ionization throughout said latex film occurs when said latex film is exposed to said moisture.

6. A humidity sensitive element comprising, a latex film, means for supporting said film, said film being electrolytic and hydroscopic in nature, and electrical conductor means embedded in said film, whereby a mass ionization throughout said film occurs when said film is exposed to moisture, said mass ionization facilitating a current carrying capacity for said element in the milliamps range.

References Cited in the file of this patent

UNITED STATES PATENTS

| | | |
|---|---|---|
| 2,510,018 | Gillingham | May 30, 1950 |
| 2,976,728 | Brogan et al. | Mar. 28, 1961 |